United States Patent
Kang et al.

(10) Patent No.: US 10,826,127 B2
(45) Date of Patent: Nov. 3, 2020

(54) COMPOSITE SEPARATOR FOR LITHIUM METAL BATTERIES

(71) Applicants: INTERNATIONAL BUSINESS MACHINES CORPORATION, Armonk, NY (US); KOREA RESEARCH INSTITUTE OF CHEMICAL TECHNOLOGY, Daejeon (KR)

(72) Inventors: Yongku Kang, Daejeon (KR); Jangwoo Kim, San Jose, CA (US); Young-Hye Na, San Jose, CA (US)

(73) Assignees: International Business Machines Corporation, Armonk, NY (US); Korea Research Institute of Chemical Technology, Daejeon (KR)

(*) Notice: Subject to any disclaimer, the term of this patent is extended or adjusted under 35 U.S.C. 154(b) by 45 days.

(21) Appl. No.: 16/147,690

(22) Filed: Sep. 29, 2018

(65) Prior Publication Data

US 2020/0106068 A1    Apr. 2, 2020

(51) Int. Cl.
| | |
|---|---|
| *H01M 10/058* | (2010.01) |
| *H01M 4/38* | (2006.01) |
| *H01M 2/16* | (2006.01) |

(52) U.S. Cl.
CPC ......... *H01M 10/058* (2013.01); *H01M 2/166* (2013.01); *H01M 4/382* (2013.01)

(58) Field of Classification Search
None
See application file for complete search history.

(56) References Cited

U.S. PATENT DOCUMENTS

| | | |
|---|---|---|
| 6,432,586 B1 | 8/2002 | Zhang |
| 7,682,731 B2 | 3/2010 | Hennige et al. |
| 7,682,740 B2 | 3/2010 | Yong et al. |
| 7,838,144 B2 | 11/2010 | Visco et al. |
| 2013/0183568 A1 | 7/2013 | Babinec et al. |

(Continued)

FOREIGN PATENT DOCUMENTS

| | | |
|---|---|---|
| EP | 1146576 A1 | 10/2001 |
| WO | 2016112333 A1 | 7/2016 |

OTHER PUBLICATIONS

Choi et al., Enhancement of thermal stability and cycling performance in lithium-ion cells through the use of ceramic-coated separators, Journal of Power Sources 195:6192-6196 (2010).

(Continued)

*Primary Examiner* — Scott J. Chmielecki
(74) *Attorney, Agent, or Firm* — Karen Canaan; CanaanLaw, P.C.

(57) ABSTRACT

A thin film coating with inorganic/organic composite materials for application on a porous separator of a rechargeable metal battery cell is disclosed. The composite material, which is comprised of ion conductive ceramic particles mixed with, or embedded within a matrix of, at least one polymer comprising at least one anionic functional group and at least one metallic cation. The composite coating layer enhances the overall electrochemical performance of rechargeable metal batteries by preventing the formation of metal dendrites on the metallic anode of a metal battery cell.

40 Claims, 8 Drawing Sheets

Single Composite Coating Layer Disposed Between a Separator and a Metallic Anode

(56) References Cited

U.S. PATENT DOCUMENTS

| | | | |
|---|---|---|---|
| 2013/0189592 A1* | 7/2013 | Roumi | H01G 11/02 |
| | | | 429/406 |
| 2015/0064601 A1* | 3/2015 | Miyahara | C08J 5/2256 |
| | | | 429/482 |
| 2015/0340676 A1 | 11/2015 | Schmidhauser et al. | |
| 2016/0141718 A1 | 5/2016 | Ye et al. | |
| 2016/0372743 A1* | 12/2016 | Cho | H01M 4/62 |
| 2017/0062829 A1* | 3/2017 | Ryu | H01M 4/628 |
| 2017/0162862 A1* | 6/2017 | Thielen | H01M 4/137 |
| 2017/0294672 A1* | 10/2017 | Warrington | H01M 8/0286 |
| 2018/0026302 A1* | 1/2018 | Kumar | H01M 2/145 |
| | | | 429/144 |
| 2018/0083279 A1* | 3/2018 | Takami | H01M 10/0562 |
| 2018/0159182 A1* | 6/2018 | Hellstrom | H01M 4/525 |
| 2018/0254450 A1* | 9/2018 | Azuma | H01M 2/1653 |
| 2018/0277868 A1* | 9/2018 | Loretz | H01M 8/188 |
| 2018/0301741 A1* | 10/2018 | Kumar | H01M 10/052 |
| 2018/0330844 A1* | 11/2018 | Aetukuri | H01M 10/056 |
| 2018/0351198 A1* | 12/2018 | Zhamu | H01M 4/623 |
| 2019/0044185 A1* | 2/2019 | Gogotsi | H01M 10/0568 |
| 2020/0035974 A1* | 1/2020 | Miller | H01M 2/1613 |
| 2020/0112050 A1* | 4/2020 | Hu | H01M 10/056 |

OTHER PUBLICATIONS

Li et al., Preparation and electrochemical characteristics of LiNi1/2Mn1/3Co1/3O2 coated with metal oxides coating, Journal of Power Sources 160:1342-1348 (2006).

Bonnet et al., Hybrid organic/inorganic membranes for a medium temperature fuel cell, Journal of New Materials for Electrochemical Systems 3:87-92 (2000).

Zhang et al., A thin inorganic composite separator for lithium-ion batteries, Journal of Membrane Science 509:19-26 (2016).

* cited by examiner

Single Composite Coating Layer Disposed Between
a Separator and a Cathode

Single Composite Coating Layer Disposed Between
a Separator and a Metallic Anode Double Composite Coating Layer Disposed Between
a Separator and Both a Cathode and a Metallic Anode

COMPOSITE SEPARATOR FOR LITHIUM METAL BATTERIES

The subject matter of this disclosure describes activities undertaken within the scope of a joint research agreement that was in place before the effective date of the instant application. The parties to the joint research agreement are International Business Machines Corporation (Armonk, N.Y., USA) and Korea Research Institute of Chemical Technology (Daejeon, South Korea).

TECHNICAL FIELD

The present invention relates generally to technologies for improving the safety and performance of rechargeable metal batteries, and more specifically, to a composite coating layer for application to porous separators on rechargeable metal battery cells to suppress dendritic growth on the metallic anodes of the batteries.

BACKGROUND

Currently, there is a high demand for rechargeable battery technologies, but the high demand is not being met due to technological challenges, such as high energy density, long cycle life, fast charging, and affordable per unit energy that can be stored. Lithium metal batteries are known as very high capacity batteries that can last hundreds of hours longer than the less robust lithium ion batteries; however, the use of high capacity lithium metal rechargeable batteries has not taken off due to the inherent instabilities of the lithium metal during battery operation, which in a worst case scenario can result in the battery exploding. When charging a lithium metal battery, lithium ions as an anode material have a tendency to nucleate and expand on a favorable area on the surface of anode electrode. As the nucleated lithium ions expand, they form "lithium dendrites," which grow vertically. When the lithium dendrites reach a certain length, they can disturb the working electrode on the opposite side of the anode leading to a violent thermal runaway reaction.

In view of the foregoing dangers inherent in rechargeable lithium metal batteries, there is a need in the art for a way to suppress the growth of lithium dendrites and consequently, to prevent the risk of thermal runaway reactions in rechargeable lithium metal batteries.

SUMMARY

The present invention addresses the need in the art by providing a rechargeable battery cell comprising a composite coating layer that prevents the formation of lithium dendrites in lithium metal batteries. The composite coating layer is not limited to application in lithium metal batteries, but may be used in any rechargeable battery with a metallic anode.

In one embodiment, the present invention relates to a rechargeable battery cell comprising: a metallic anode; a cathode, a separator between the metallic anode and the cathode, wherein the separator has a first coating layer disposed between the separator and one of the metallic anode and the cathode, wherein the first coating layer is comprised of a mixture of first ion-conducting ceramic particles and at least one first polymer, the at least one first polymer comprises at least one first anionic functional group and at least one first metallic cation, and wherein the at least one first anionic functional group interacts with the at least one first metallic cation.

In another embodiment, the first coating layer is disposed between the separator and the metallic anode.

In a further embodiment, the separator has a second coating layer disposed between the separator and the cathode, wherein the second coating layer comprises a mixture of second ion-conducting ceramic particles and at least one second polymer, the at least one second polymer comprising at least one second anionic functional group and at least one second metallic cation, wherein the at least one second anionic functional group interacts with the at least one second metallic cation.

In another embodiment, the present invention relates to a rechargeable battery cell comprising: a metallic anode; a cathode; and a porous membrane between the cathode and the metallic anode, wherein the porous membrane has a coating layer disposed between the porous membrane and the metallic anode, wherein the coating layer comprises a mixture of ion-conducting ceramic particles and at least one polymer, the at least one polymer comprising at least one anionic functional group and at least one metallic cation, wherein the at least one anionic functional group interacts with the at least one metallic cation.

In a further embodiment, the present invention relates to a method for formulating a rechargeable battery cell comprising the steps of: (a) obtaining an electrically non-conductive porous membrane as the separator, wherein the separator has two sides; (b) coating one side of the separator with the first coating layer; (c) placing the separator between the metallic anode and the cathode, wherein the first coating layer is disposed between the separator and the metallic anode, wherein upon electrical charging of the rechargeable battery cell, the first coating layer suppresses dendritic growth on the metallic anode.

In another embodiment, the present invention relates to a method for formulating a rechargeable battery cell, comprising the steps of: (a) obtaining an electrically non-conductive porous membrane as the separator, wherein the separator has two sides; (b) coating one side of the separator with the first coating layer and the other side of the separator with the second coating layer; (c) placing the separator between the metallic anode and the cathode, wherein upon electrical charging of the rechargeable battery cell, the first and second coating layers suppress dendritic growth on the metallic anode.

In a further embodiment, the at least one first polymer is a polymer matrix and the first ion-conducting ceramic particles are embedded in the polymer matrix.

In another embodiment, the at least one second polymer is a polymer matrix and the second ion-conducting ceramic particles are embedded in the polymer matrix.

In a further embodiment, the metallic anode is made of a metal selected from the group consisting of lithium, aluminum, cadmium, calcium, copper, germanium, lead, magnesium, potassium, sodium, silicon, tin, titanium, zinc, and combinations thereof.

In another embodiment, the metallic anode comprises lithium metal.

In a further embodiment, the cathode is made from a compound selected from the group consisting of oxygen, porous carbon, carbon monofluoroide, thionyl chloride, sulfur, lithium cobalt oxide, lithium iron phosphate, lithium manganese oxide, lithium nickel manganese cobalt oxide, lithium nickel cobalt aluminum oxide, lithium titanate, and combinations thereof.

In another embodiment, the cathode comprises oxygen and/or porous carbon.

In a further embodiment, the separator/electrically non-conductive porous membrane is made of a material selected from the group consisting of polyethylene, polypropylene, glass microfiber, alumina, and combinations thereof.

In another embodiment, the separator/electrically non-conductive porous membrane comprises polyethylene.

In a further embodiment, the separator is an electrically non-conductive porous membrane.

In another embodiment, the electrically non-conductive porous membrane has pore dimensions in the range of 0.1 µm to 10 µm.

In a further embodiment, the electrically non-conductive porous membrane has pore dimension in the range of 1 nm to 100 nm.

In another embodiment, the first ion-conducting ceramic particles are selected from the group consisting of a perovskite-type oxide, a garnet-type oxide, lithium phosphate, a solid with the chemical formula $Li_{2+2x}Zn_{1-x}GeO_4$ where $0<x<3$, a solid with the chemical formula $Na_{1+x}Zr_2Si_xP_{3-x}O_{12}$ where $0<x<3$, lithium aluminum titanium phosphate (LATP), lithium aluminum germanium phosphate (LAGP), lithium aluminum tantalum titanium phosphate (LATTP), and combinations thereof.

In a further embodiment, the second ion-conducting ceramic particles are selected from the group consisting of perovskite-type oxide, a garnet-type oxide, lithium phosphate, a solid with the chemical formula $Li_{2+2x}Zn_{1-x}GeO_4$ where $0<x<3$, a solid with the chemical formula $Na_{1+x}Zr_2Si_xP_{3-x}O_{12}$ where $0<x<3$, lithium aluminum titanium phosphate (LATP), lithium aluminum germanium phosphate (LAGP), lithium aluminum tantalum titanium phosphate (LATTP), and combinations thereof.

In another embodiment, the first ion-conducting ceramic particles comprise lithium aluminum tantalum titanium phosphate (LATTP).

In a further embodiment, the second ion-conducting ceramic particles comprise lithium aluminum tantalum titanium phosphate (LATTP).

In another embodiment, the at least one first polymer is selected from the group consisting of polysulfone, polyether sulfone, polystyrene, polyether ether ketone, polytetrafluoroethylene, and combinations thereof.

In a further embodiment, the at least one first polymer comprises polysulfone.

In another embodiment, the at least one second polymer is selected from the group consisting of polysulfone, polyether sulfone, polystyrene, polyether ether ketone, polytetrafluoroethylene, and combinations thereof.

In a further embodiment, the at least one second polymer comprises polysulfone.

In another embodiment, the at least one first anionic functional group is selected from the group consisting of sulfonate, sulfate, carboxylate, phosphonate, phosphate, borate, carboxylate, silicate, and combinations thereof.

In a further embodiment, the at least one first anionic functional group comprises sulfonate.

In another embodiment, the at least one second anionic functional group is selected from the group consisting of sulfonate, sulfate, carboxylate, phosphonate, phosphate, borate, carboxylate, silicate, and combinations thereof.

In a further embodiment, the at least one second anionic functional group comprises sulfonate.

In another embodiment, the at least one first metallic cation is selected from the group consisting of lithium ions, sodium ions, potassium ions, magnesium ions, and combinations thereof.

In a further embodiment, the at least one first metallic cation comprises lithium ions.

In another embodiment, the at least one first metallic cation is derived from the same metal as the metallic anode.

In a further embodiment, the at least one second metallic cation is selected from the group consisting of lithium ions, sodium ions, potassium ions, magnesium ions, and combinations thereof.

In another embodiment, the at least one second metallic cation comprises lithium ions.

In a further embodiment, the at least one second metallic cation is derived from the same metal as the metallic anode.

In another embodiment, the metallic anode comprises lithium metal, the cathode comprises oxygen and/or porous carbon, and the separator comprises polyethylene.

In a further embodiment, the first ion-conducting ceramic particles comprise lithium aluminum tantalum titanium phosphate (LATTP), the at least one first polymer comprises polysulfone, the at least one first anionic functional group comprises sulfonate, and the at least one first metallic cation comprises lithium ions.

In another embodiment, the second ion-conducting ceramic particles comprise lithium aluminum tantalum titanium phosphate (LATTP), the at least one second polymer comprises polysulfone, the at least one second anionic functional group comprises sulfonate, and the at least one second metallic cation comprises lithium ions.

In a further embodiment, the rechargeable battery cell comprises at least one electrolyte disposed between the metallic anode and the cathode, comprising a lithium salt dissolved in an organic solvent.

In another embodiment, the rechargeable battery cell comprises at least one electrolyte disposed between the metallic anode and the cathode, comprising a lithium salt in a polymer gel matrix.

Additional aspects and embodiments of the invention will be provided, without limitation, in the detailed description of the invention that is set forth below.

BRIEF DESCRIPTION OF THE DRAWINGS

In FIGS. 1A and 1B, the separator is shown with crosshatching; the composite coating layer is shown as black geometric shapes; the cathode on the top layer of the stack is shown with forward slashes; and the metallic cathode on the bottom of the stack is shown with back slashes. In FIG. 1A, the composite coating layer is disposed between the separator and the cathode and in FIG. 1B, the composite coating layer is disposed between the separator and the metallic anode. In FIG. 1C, the separator is coated on both sides with the composite coating layer so that the composite coating layer is disposed between the separator and both the cathode and the metallic anode.

In FIG. 3B, the composite coating layer is disposed between the separator and the cathode. In FIG. 3C, the composite coating layer is disposed between the separator and the lithium anode. In FIG. 3D, the composite coating layer is disposed between the separator and both the lithium anode and the cathode.

DETAILED DESCRIPTION

Figure 1A:
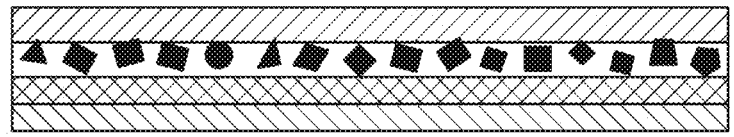
FIGS. 1A-1C are schematic illustrations of a composite coating layer as described herein and three ways that it may be assembled in a lithium metal battery cell.

Set forth below is a description of what are currently believed to be preferred embodiments of the claimed invention. Any alternates or modifications in function, purpose, or structure are intended to be covered by the claims of this application. As used in this specification and the appended claims, the singular forms "a," "an," and "the" include plural referents unless the context clearly dictates otherwise. The terms "comprises" and/or "comprising," as used in this specification and the appended claims, specify the presence of stated features, integers, steps, operations, elements, and/or components, but do not preclude the presence or addition of one or more other features, integers, steps, operations, elements, components, and/or groups thereof.

As used herein, the term "rechargeable metal battery" is used to refer to a rechargeable battery with a metallic anode.

As used herein, the terms "composite coating layer," "composite coating," and "coating layer" refer to a hybrid inorganic-organic composite coating layer comprised of ion-conducting ceramic particles and at least one polymer, the polymer comprising at least one anionic functional group and at least one metallic cation (also referred to herein as "the functionalized polymer"), wherein the at least one anionic functional group interacts with the at least one metallic cation. The composite coating layer prevents dendritic growth on the metallic anode of a rechargeable metal battery thus improving the performance and safety of the rechargeable metal battery. The ion conductive ceramic particles may be mixed with the at least one functionalized polymer or alternatively, the ion conductive ceramic particles may be embedded in a matrix comprised of the at least one functionalized polymer.

Examples of ion conductive ceramic particles that may be used for the composite coating layer are a perovskite-type oxide (a calcium titanium oxide mineral composed of calcium titanate, $CaTiO_3$), a garnet-type oxide ($Li_7La_3Zr_2O_{12}$), lithium phosphate ($Li_3PO_4$), a solid with the chemical formula $Li_{2+2x}Zn_{1-x}GeO_4$ where $0<x<3$ (also known as a lithium super ionic conductor or LISICON®, Merck KGaAD, Darmstadt, Germany), and a solid with the chemical formula $Na_{1+x}Zr_2Si_xP_{3-x}O_{12}$ where $0<x<3$ (also known as a sodium super ionic conductor or NASICON), lithium aluminum titanium phosphate (LATP), lithium aluminum germanium phosphate (LAGP), lithium aluminum tantalum titanium phosphate (LATTP), and combinations thereof. The percentage of ion conductive ceramic particles to the functionalized polymer in the composite coating layer will typically be 50:50, but may be any other percentage, examples being without limitation, 70:30, 60:40, 30:70, or 40:60.

Examples of polymers that may be used for the at least one polymer of the composite coating layer include without limitation, polysulfone, polyether sulfone, polystyrene, polyether ether ketone, polytetrafluoroethylene, and combinations thereof. The at least one anionic functional groups may be attached to any part of the polymer, including without limitation, the polymer backbone. Examples of anionic functional groups that may be attached to the at least one polymer include without limitation, sulfonate, sulfate, phosphonate, phosphate, borate, carboxylate, silicate, and combinations thereof.

As used herein, the terms "separator," "membrane," and "separator membrane" are used interchangeably herein to refer to an electrically non-conductive material that is disposed between the anode and the cathode of the battery cell. The separator/membrane may be a porous separator/membrane with microporous and/or nanoporous dimensions. Where the separator is a "porous membrane," the separator may also be referred to herein as a "porous separator." The thickness of the membrane will be in the range of about 10 µm to about 100 µm and may vary depending on the material used. In general, separator membranes should be of uniform thickness to support many charging cycles. Membranes that are too thin may compromise mechanical strength and safety, and membranes that are too thick may prevent the metal ions from passing through the separator resulting in an inoperable battery. Examples of materials that may be used for the porous separator/membrane are polyethylene, polypropylene, glass microfiber, alumina, and combinations thereof. The microporous and/or nanoporous membrane will have pore dimensions that range from about 1 nm to about 10 µm. The size of the pores on a microporous membrane will be in the range of about 0.1 µm to about 10 µm, and the size of the pores on a nanoporous membrane will be in the range of about 1 nm to about 100 nm.

As is known to those of skill in the art, a battery consists of some number of voltaic cells, each cell consisting of two half-cells that are connected in series by at least one conductive electrolyte containing electrodes, i.e., anodes and cathodes, to which anions and cations migrate, respectively. The electrodes, which do not touch, are connected by the electrolyte, the latter of which may be the same or can differ for each half-cell. A separator allows the positive and negative ions to flow between the half-cells while preventing the mixing of the at least one electrolyte in each half-cell. In a typical battery, one half-cell includes an electrolyte and the negative anode to which anions migrate, and the other half-cell includes an electrolyte and the positive cathode to which cations migrate. During the reactions that power the battery (also known as redox reactions), cations are reduced at the cathode (through the addition of electrons) during charging while anions are oxidized at the anode (through the removal of electrons) during charging. During discharge, the process is reversed so that cations are oxidized at the cathode during discharge and anions are reduced at the anode during charging.

The composite coating layer described herein may be applied to one or both sides of the separator of a rechargeable metal battery cell to prevent dendritic growth on the metallic anode. Where the separator is coated on one side, the composite coating layer may be disposed between the separator and the cathode (e.g., FIG. 1A) or disposed between the separator and the metallic anode (e.g., FIG. 1B). Where the separator is coated on both sides, the composite coating layer will be disposed between the separator and both the cathode and the metallic anode (e.g., FIG. 1C).

In one embodiment, the present invention relates to a rechargeable metal battery cell comprising: a metallic anode; a cathode; a separator between the cathode and the metallic anode, wherein the separator has a first coating layer disposed between the separator and one of the metallic anode and the cathode, wherein the first coating layer comprises a mixture of first ion-conducting ceramic particles and at least one first polymer, the at least one first polymer comprising at least one first anionic functional group and at least one first metallic cation, wherein the at least one first anionic functional group interacts with the at least one first metallic cation.

In a further embodiment, the first coating layer on the separator of the rechargeable battery cell is disposed between the separator and the metallic anode.

In another embodiment, the separator of the rechargeable metal battery cell has a second coating layer disposed between the separator and the cathode, wherein the second coating layer comprises a mixture of second ion-conducting ceramic particles and at least one second polymer, the at least one second polymer comprising at least one second anionic functional group and at least one second metallic cation, wherein the at least one second anionic functional group interacts with the at least one second metallic cation.

In a further embodiment, the present invention relates to a rechargeable metal battery cell comprising: a metallic anode; a cathode; and a porous membrane between the cathode and metallic anode, wherein the porous membrane has a coating layer disposed between the porous membrane and the metallic anode, wherein the coating layer comprises a mixture of ion-conducting ceramic particles and at least one polymer, the at least one polymer comprising at least one anionic functional group and at least one metallic cation, wherein the at least one anionic functional group interacts with the at least one metallic cation.

In another embodiment, the present invention relates to a method for formulating a rechargeable metal battery cell comprising the steps of: (a) obtaining an electrically non-conductive porous membrane with microporous and/or nanoporous dimensions as the separator, wherein the separator has two sides; (b) coating one side of the separator with the first coating layer; (c) placing the coated separator between the metallic anode and the cathode, wherein the first coating layer is disposed between the separator and the metallic anode, wherein upon electrical charging of the rechargeable metal battery cell, the first coating layer suppresses dendritic growth on the metallic anode.

In a further embodiment, the present invention relates to a method for formulating a rechargeable metal battery cell comprising the steps of: (a) obtaining an electrically non-conductive porous membrane with microporous and/or nanoporous dimensions as the separator, wherein the separator has two sides; (b) coating one side of the separator with the first coating layer and the other side of the separator with the second coating layer; (c) placing the coated separator between the metallic anode and the cathode, wherein the first coating layer is disposed between the separator and the metallic anode and the second coating layer is disposed between the separator and the cathode, wherein upon electrical charging of the rechargeable metal battery cell, the first and second coating layers suppress dendritic growth on the metallic anode.

In another embodiment, the separator of a rechargeable metal battery cell is coated on one side with the composite coating described herein and the single composite coating layer is in contact with the cathode or the metallic anode. In a further embodiment, the separator of a rechargeable metal battery cell is coated on both sides with the composite coating described herein and the double composite coating layer is in contact with both the cathode and the metallic anode. It is to be understood that additional battery components required for the battery to function (such as an electrolyte) should not impede the ability of composite coating layer to interact with the electrode(s).

Examples of metals that are used in the manufacture of metallic anodes for use in rechargeable metal batteries include, without limitation, lithium, aluminum, cadmium, calcium, copper, germanium, lead, magnesium, potassium, sodium, silicon, tin, titanium, zinc, and combinations thereof. Examples of compounds that are used for the manufacture of cathodes for use in rechargeable metal batteries include, without limitation, oxygen, porous carbon, carbon monofluoroide, thionyl chloride, sulfur, lithium cobalt oxide, lithium iron phosphate, lithium manganese oxide, lithium nickel manganese cobalt oxide, lithium nickel cobalt aluminum oxide, lithium titanate, and combinations thereof.

Examples of rechargeable metal batteries currently used in the art that benefit from the composite coating layer described herein include, without limitation, lithium metal batteries and metal air batteries. In lithium metal batteries, the anode is a solid electrode comprised of lithium metal and the cathode is comprised of one or more of the cathode compounds known in the art (non-limiting examples set forth above). When the cathode of a lithium metal battery is an ambient air electrode comprised of oxygen, the battery is known as a "lithium air" or a "lithium oxygen" battery. In metal air batteries, the cathode is an ambient air electrode comprised of oxygen and the metallic anode is comprised of one or more of the metallic anode metals known in the art (non-limiting examples set forth above). A battery known as a "lithium air" or a "lithium oxygen" battery is a lithium metal battery with an ambient air electrode comprised of oxygen or a metal air battery with a metallic anode comprised of lithium. As already noted, the composite coating layer is not intended for use on just lithium metal or lithium air batteries, but has utility for application on the separator of any rechargeable metal battery.

Electrolytes for use on the rechargeable metal batteries described herein are typically in liquid or gel form. Liquid electrolytes are comprised of lithium salts dissolved in an organic solvent, and gel polymer electrolytes (GPE) are comprised of lithium salts in a polymer matrix. During battery operation with a liquid electrolyte, the organic solvent decomposes on the negative electrodes forming a solid electrolyte interface (SEI) layer that insulates and provides ion conductivity. During battery operation with a GPE, the gel polymer forms the SEI on the anode as a passivation film that separates the anode from the cathode while still allowing ions to pass through. To avoid capacity reduction and electrolyte oxidation on the cathode in a lithium metal battery using a GPE, additives, such as a carbonate (e.g., vinylene carbonate), a lactone, or an ionic liquid, may be mixed into the polymer.

Examples of lithium salts for electrolyte use on rechargeable metal batteries include without limitation, lithium hexafluorophosphate ($LiPF_6$), lithium tetrafluoroborate ($LiBF_4$), lithium perchlorate ($LiCO_4$), lithium hexafluoroarsenate ($LiAsF_6$), lithium trifluoromethanesulfonate (LiTf), lithium bistrifluoromethanesulfonimidate (LiTFSI), lithium bis(oxalato)borate (LiBOB), lithium iodide (LiI), lithium bromide (LiBr), lithium chloride (LiCl), and lithium fluoride (LiF). Examples of organic solvents for dissolving lithium salts for liquid electrolytes include without limitation, propylene carbonate (a high permittivity solvent), dimethoxyethane (a low viscosity solvent), ethylene glycol methylene ether, diethylene glycol dimethyl ether, triethylene glycol dimethyl ether, tetraethylene glycol dimethyl ether, ethylene carbonate, dimethyl carbonate, diethyl carbonate, ethyl methyl carbonate, dimethyl formamide, dimethyl sulfoxide, and tetrahydrofuran. Examples of polymers for mixing with lithium salts for GPEs include without limitation, (poly) ethylene oxide (PEO), poly(acrylonitrile) (PAN), poly(m-ethyl methacrylate) (PMMA), poly(vinylidene fluoride) (PVdF), and poly(vinylidene fluoride-hexafluoro propylene (PVdF-HFP).

In the description of the Figures and the Examples that follow, lithium air batteries are described for illustrative purposes; however, it is to be understood that the composite coating layer described herein may be used on any rechargeable metal battery where metal dendrite formation on metallic anodes is a factor in reduced battery recharge capacity and/or rechargeable metal battery safety.

Figure 1B:
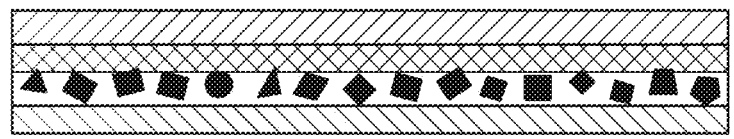
Figure 1C:
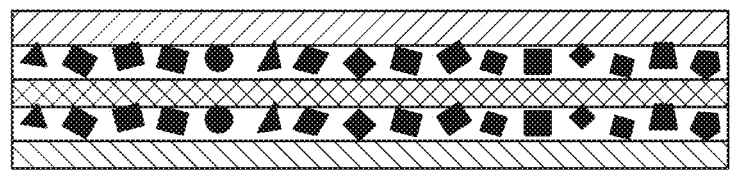

FIGS. 1A-1C are schematic illustrations of the composite coating layer described herein and its assembly in a lithium metal battery cell. As shown therein, the composite coating layer (black geometric shapes) may be applied on a separator (crosshatching) as a single side coating disposed between the separator and the cathode (forward slashes) (FIG. 1A); a single side coating disposed between the separator and the lithium anode (back slashes) (FIG. 1B); or as a double side coating disposed between both the cathode and the lithium anode (FIG. 1C). Example 1 describes the preparation of the composite coating layer and its application as a single side coating disposed between a separator and a metallic anode of a lithium oxygen battery cell.

The composite coating layer described herein has the following advantages: (1) it removes the inherent risk of lithium metal battery electronic shorting by suppressing lithium dendrite growth; and (2) it significantly reduces lithium metal charge transfer resistance through enhanced reaction kinetics and electrolyte wettability thus facilitating the lithium ions to run both towards and away from the active electrode surface. The improvement of the charge transfer kinetics using the composite coating layer described herein is surprising and unexpected because it goes against the typical electrochemical impedance behavior for additional ceramic layers on active electrode surfaces; such additional coatings being known to increase charge transfer resistance. By contrast, the composite coating layer described herein significantly enhances the overall electrochemical performance of lithium metal batteries.

Figure 2:
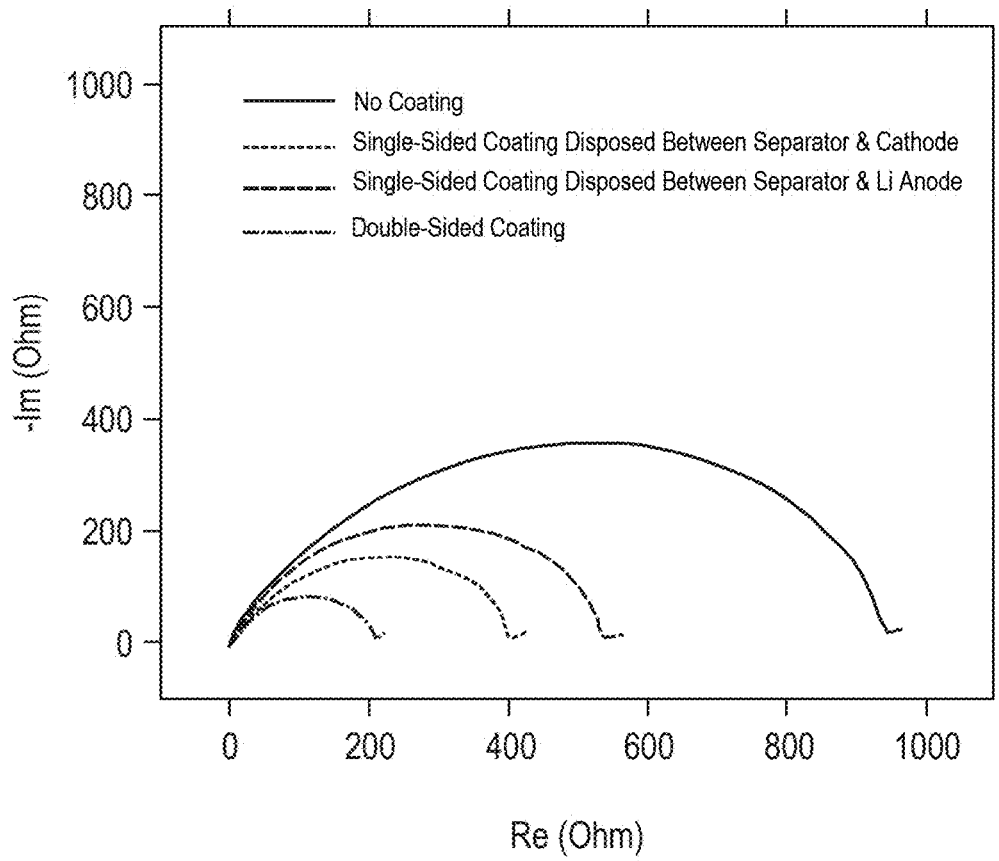
FIG. 2 is a graph showing electrochemical impedance spectroscopy (EIS) spectra of lithium metal battery cells with and without the composite coating layer described herein.

FIG. 2 shows the EIS spectra of lithium metal battery cells under four conditions: (1) without a composite coating layer on the microporous polymeric separator of the battery cell; (2) with a single-sided composite coating layer applied to the microporous separator, wherein the composite coating layer is disposed between the microporous separator and the cathode; (3) with a single-sided composite coating layer applied to the microporous separator, wherein the composite coating layer is disposed between the microporous separator and the lithium anode; and (4) with a double-sided composite coating layer applied to the microporous separator, wherein the composite coating layer is disposed between both the cathode and the lithium anode. As shown in the graph, the charge transfer resistance of the battery cell with the double-side coated separator is approximately five times smaller than that of the cell without any coatings. In the case of the single-side coated separator, there may be a small difference (~100 Ohm) in the charge transfer resistance of the cell depending on which electrode the coated side of the separator contacts. For example, in FIG. 2, a battery cell with a single composite coating layer disposed between the separator and the cathode has a lower charge transfer resistance than a battery cell with a single composite coating layer disposed between the separator and the lithium anode.

Figure 3A:
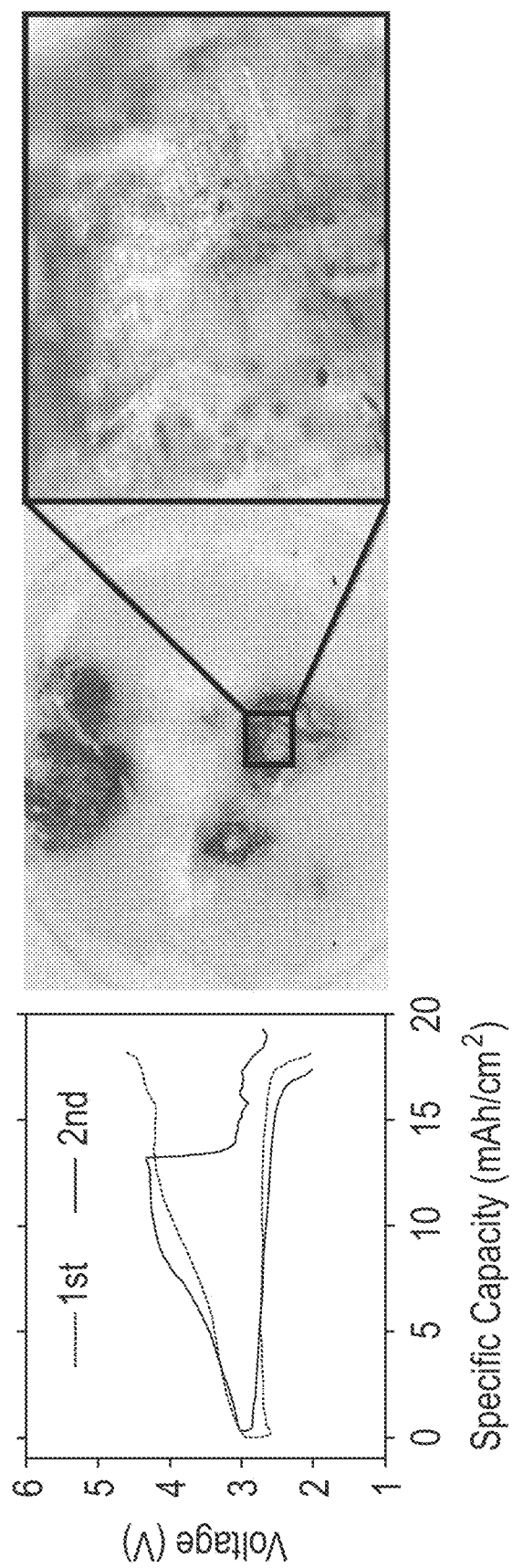
FIGS. 3A-3D are four graphs and corresponding digital microscopic images showing the galvanostatic cycling behavior of the separators of lithium oxygen battery cells without (FIG. 3A) and with (FIGS. 3B, 3C, and 3D) the composite coating layer described herein.
Figure 3B:
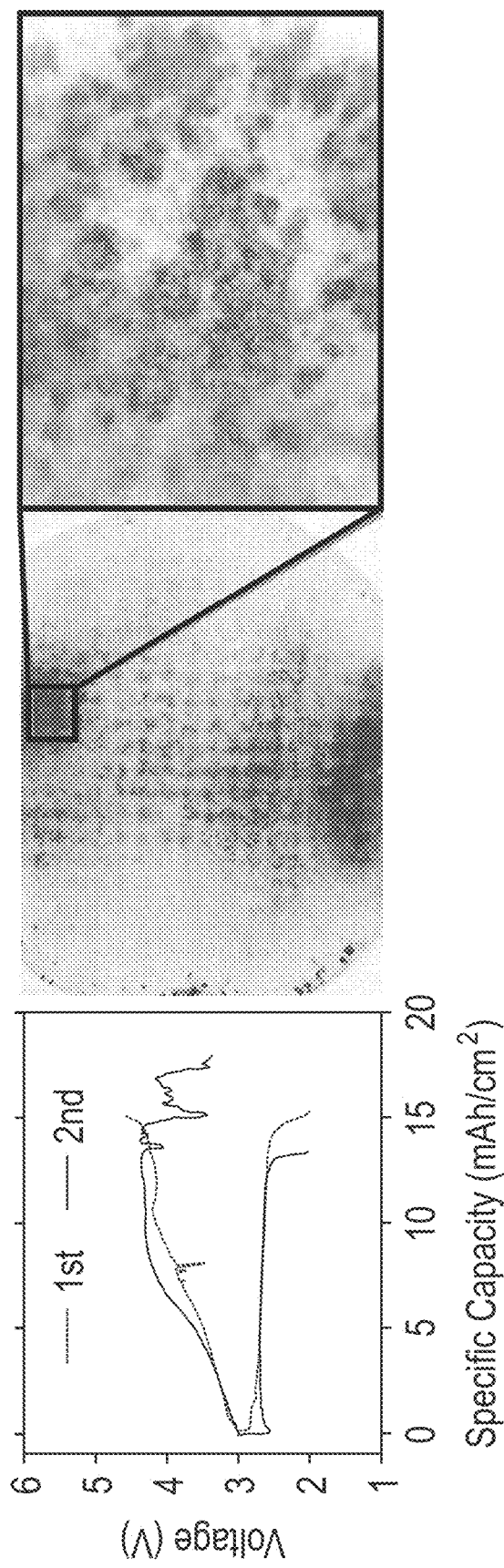

FIGS. 3A-3D include four graph and corresponding digital microscopic images showing the galvanostatic cycling behavior of the separators of lithium oxygen batteries (i.e., lithium metal batteries using oxygen as an active cathode material) without (panel A) and with (panels B, C, and D) the composite coating layer described herein. In FIG. 3B, the composite coating layer is disposed between the separator and the carbon cathode; in FIG. 3D, the composite coating layer is disposed between the separator and the lithium anode; and in FIG. 3D, the composite coating layer is disposed between both the carbon cathode and the lithium anode. Each panel shows measurements of the separator after two charge-discharge cycles.

With reference to FIG. 3A (the lithium oxygen battery cell without the composite coating layer) and FIG. 3B (the lithium oxygen battery cell with the composite coating layer disposed between the separator and the carbon cathode), when the separators are removed after the first cycle, the battery cells show similar charge-discharge behavior; however, when the separators are removed after the second cycle, the battery cells show a significant drop in the charge over potential in the middle of the second cycle. The corresponding digital microscopic images of the separator taken out after the second cycle in FIG. 3A and 3B clearly show the local deposition of lithium dendrites focused on a few number of spots. As the drop in the charge over potential corresponds to the long and strong dendritic growth that is seen in the images, it follows that the dendritic growth causes the drop in charge over potential of the battery cell at the second cycle.

Figure 3C:
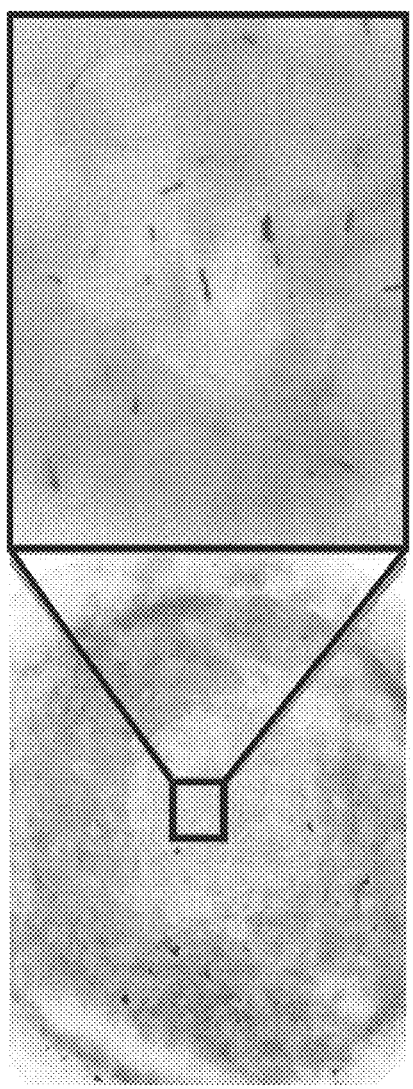
Figure 3C:
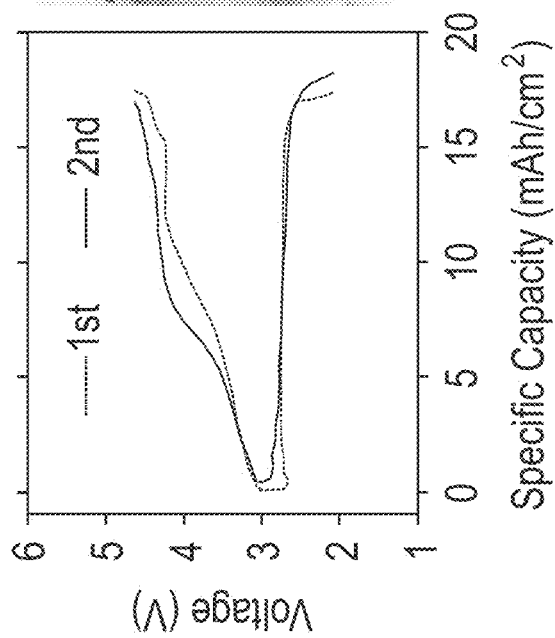
Figure 3D:
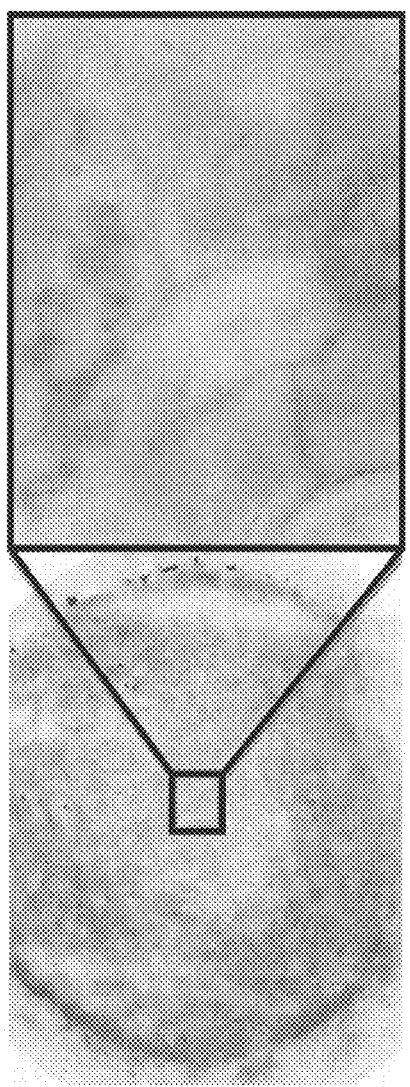
Figure 3D:
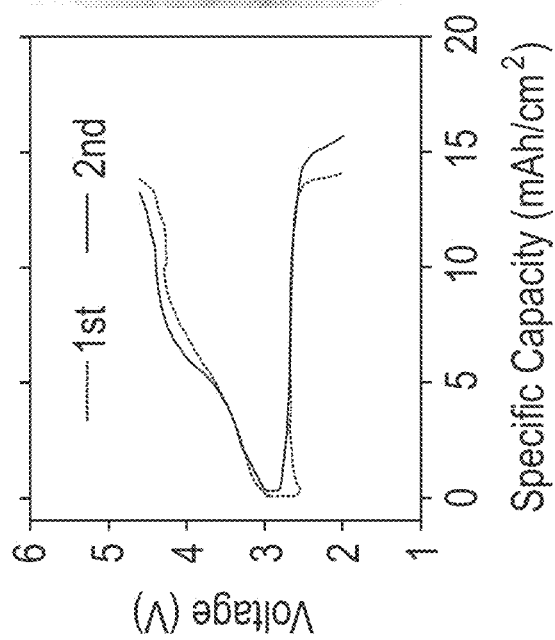

With reference to FIG. 3C (the lithium oxygen battery cell with the composite coating layer disposed between the separator and the lithium anode) and FIG. 3D (the lithium oxygen battery cell with the composite coating layer disposed between the separator and the cathode and lithium anode), removal of the separator after the first cycle shows similar charge-discharge behavior as was seen in FIGS. 3A and 3B, and removal of the separator after the second cycle shows similar charge-discharge behavior as was seen after the first cycle. The corresponding digital microscopic images of the separator taken out after the second cycle in FIGS. 3C and 3D show no apparent signs of lithium dendrite growth or local deposition of lithium dendrites in either the cycling behavior or microscopic images of the separator after the second cycle.

FIGS. 3A-3D demonstrate that when the composite coating layer described herein is disposed between a separator and a lithium anode, the composite coating layer suppresses lithium dendrite growth and/or the local deposition of lithium dendrites. FIGS. 3B-3D also show that when the composite coating layer is disposed between a separator and a lithium anode, the lithium metal battery has ~20% higher specific capacity in comparison to lithium metal batteries having the composite layer disposed between a separator and a carbon cathode.

Figure 4:
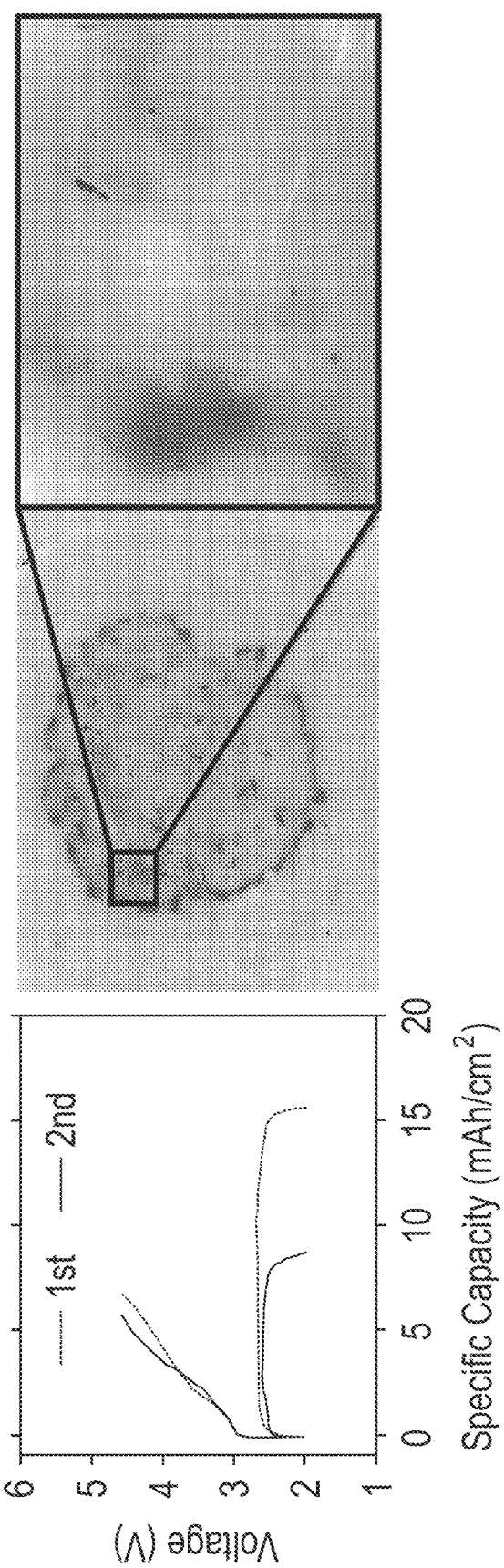
FIG. 4 is a graph and corresponding digital microscopic images showing the galvanostatic cycling behavior of a separator of a lithium oxygen battery where the separator is coated only with a sulfonated polymer (without an ion conductive ceramic), where the sulfonated polymer coating is disposed between the separator and the lithium anode.
Figure 5:
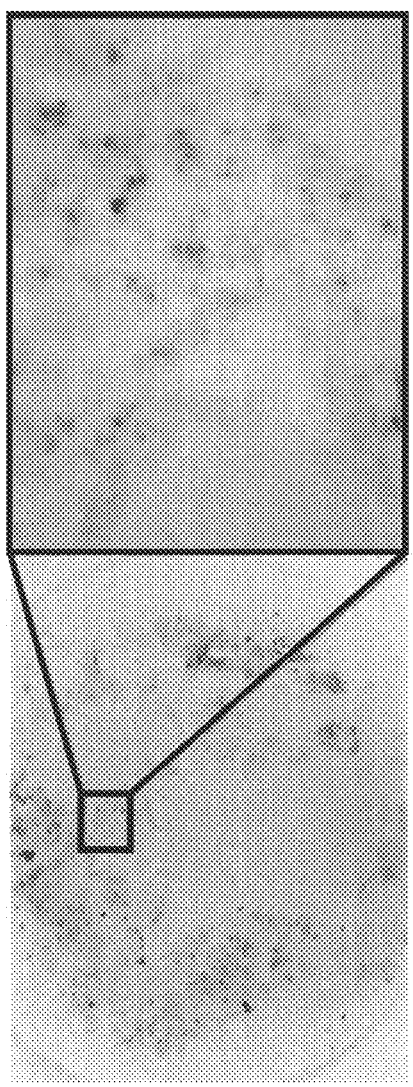
FIG. 5 is a graph and corresponding digital microscopic images showing the galvanostatic cycling behavior of a separator of a lithium oxygen battery cell where the separator is coated with a sulfonated polymer and non-ion-conducting ceramic particles, where the coating is disposed between the separator and the lithium anode.
Figure 5:
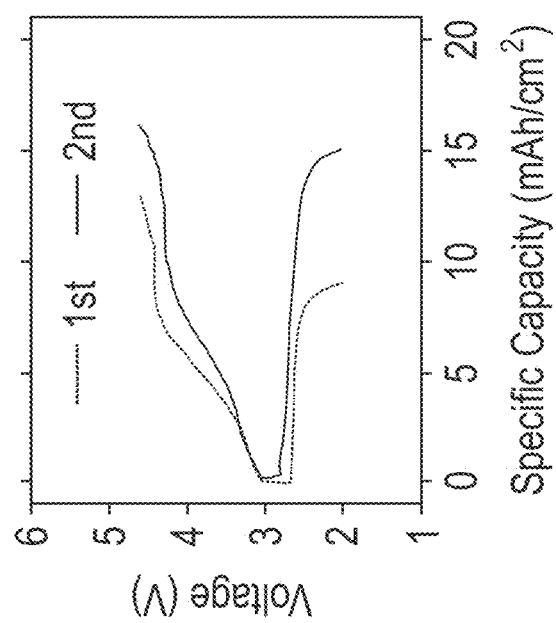

FIGS. 4 and 5, and Examples 2 and 3, respectively, demonstrate the effectiveness of the composite coating layer described herein by comparatively showing the results of separators coated without the ion conductive ceramic particles of the composite coating layer (FIG. 4 and Example 2)

or with the replacement of the ion conductive ceramic particles with non-ion conductive ceramic particle (FIG. 5 and Example 3).

FIG. 4, by way of a graph and corresponding digital microscopic images, shows the galvanostatic cycling behavior of a separator of a lithium oxygen battery where the separator is coated only with the sulfonated polymer NAFION® (The Chemours Company, LLC, Wilmington, Del.), with the coating disposed between the separator and the lithium anode. NAFION is a sulfonated polytetrafluoroethylene polymer and thus has application as an exemplary sulfonated polymer for use with the lithium metal battery technology described herein. As shown in FIG. 4, while removal of the separator after the second cycle showed no apparent dendrite growth or local dendrite deposition, the charge capacity of the battery cell after the second cycle was significantly diminished when compared to the charge capacity of the battery cell after the first cycle.

FIG. 5, by way of a graph and corresponding digital microscopic images, shows the galvanostatic cycling behavior of a separator of a lithium oxygen battery where (i) the separator is coated with NAFION as an example of a sulfonated polymer and (ii) alumina ($Al_2O_3$) as an example of a non-ion conductive ceramic particle, with the coating disposed between the separator and the lithium anode. As shown in FIG. 5, while the separator showed no apparent dendrite growth or local dendrite deposition when removed after the second cycle, the battery cell showed a significant drop in the discharge capacity in the second cycle when compared to the discharge capacity of the first cycle.

In contrast to the results shown in FIGS. 4 and 5, the composite coating layer described herein and shown in operation in FIGS. 3C and 3D consistently shows a similar discharge capacity between the first and second cycles. As explained herein, the consistent discharge capacity between the first and second cycles is the result of the suppression of lithium dendrite formation on the surface of the separator. The reduction/elimination of localized dendrites on the surface of the separator results in enhanced reaction kinetics, reduced lithium metal charge transfer resistance, and most importantly, a significantly reduced risk of runaway thermal reactions.

It is to be understood that while the invention has been described in conjunction with the embodiments set forth above, the foregoing description as well as the examples that follow are intended to illustrate and not limit the scope of the invention. Further, it is to be understood that the embodiments and examples set forth herein are not exhaustive and that modifications and variations of the invention will be apparent to those of ordinary skill in the art without departing from the scope and spirit of the invention.

Experimental

The following examples are set forth to provide those of ordinary skill in the art with a complete disclosure of how to make and use the aspects and embodiments of the invention as set forth herein. While efforts have been made to ensure accuracy with respect to variables such as amounts, temperature, etc., experimental error and deviations should be taken into account. Unless indicated otherwise, parts are parts by weight, temperature is degrees centigrade, and pressure is at or near atmospheric. All components were obtained commercially unless otherwise indicated.

EXMAPLE 1

Preparation of the Composite Coating Layer and Single Side Application on a Lithium Metal Battery Cell A neutral dispersion containing ~10 wt. % of lithiated NAFION polymer in an isopropyl alcohol solvent) and $Li_{1.6}Al_{0.5}Ti_{0.95}Ta_{0.5}(PO_4)$, (LATTP) compound powder (an exemplary ion conductive ceramic) was prepared in 1:1 weight ratio in a 20-mL vial and stirred with a magnetic bar for an hour. The dispersion was then used to cast a thin film composite layer (~50 um) via a doctor blading coating process on top of a polyethylene microporous separator gifted (Toray Plastics (America), Inc., North Kingstown, R.I.). The composite coated membrane was then dried on a hot plate at ~70° C. for another hour. The same process can be done on the other side of the porous separator membrane for the double-side coating.

The prepared composite coated membrane was disc-cut 12 mm in diameter and used as the separator in a lab-made battery-type SWAGELOK® (Swagelok Company, Solon, Ohio) cell along with a lithium metal foil anode on one side and porous carbon cathode on the other. The porous carbon cathode was made with carbon black nanoparticle and stainless-steel mesh. The assembly was done in an argon-filled glovebox (<0.1 ppm H2O, O2). The lithium metal anode was placed on the bottom of the cell with the separator in the middle and the carbon cathode on the top where the ultrahigh purity oxygen is introduced while operating the cell.

EXAMPLE 2

Comparative Example Showing the Behavior of Sulfonated Polymer Coating

Without Ion Conductive Ceramic

The separator of a lithium oxygen battery with a SWAGELOK cell was coated only with NAFION, the latter serving as an example of a sulfonated polymer without ion conductive ceramic particles. As shown in FIG. 4, even without ion conductive ceramic particles, the first discharge capacity of the battery cell showed gains that are equivalent to those of a battery with the composite coating layer described herein. The microscopic image of the separator taken out after the second cycle did not display any apparent local deposition of the lithium dendrites; however, as seen in the graph of FIG. 4, the charge curve after the first discharge reached its cut-off voltage much faster than it should have in order to convert and reverse the reaction products generated during the discharge, the result being a sudden drop of the discharge capacity in the second cycle.

EXAMPLE 3

Comparative Example Showing the Behavior of Non-Ion Conductive Ceramic (AL2O3) And Sulfonated Polymer Coating The separator of a lithium oxygen battery with a SWAGELOK cell was coated with NAFION as an example of a sulfonated polymer and alumina ($Al_2O_3$) as an example of a non-ion conductive ceramic particle. As shown in FIG. 5, the first discharge capacity gained as much as that of the battery with the composite coating layer described herein. The microscopic image of the separator taken out after the second cycle did not display any apparent local deposition of the lithium dendrites; however, as seen in the graph of FIG. 5, the discharge capacity in the second cycle dropped significantly from the discharge capacity in the first cycle.

We claim:

1. A rechargeable battery cell comprising:
a metallic anode;
a cathode; and
a separator between the cathode and the metallic anode, wherein the separator has a first coating layer disposed between the separator and one of the metallic anode and the cathode, wherein the first coating layer comprises a mixture of first ion-conducting ceramic particles and at least one first polymer, the at least one first polymer comprising at least one first anionic functional group and at least one first metallic cation, wherein the at least one first anionic functional group interacts with the at least one first metallic cation to suppress dendritic growth on the metallic anode.

2. The rechargeable battery cell of claim 1, wherein the first coating layer is disposed between the separator and the metallic anode.

3. The rechargeable battery cell of claim 2, wherein the separator has a second coating layer disposed between the separator and the cathode, wherein the second coating layer comprises a mixture of second ion-conducting ceramic particles and at least one second polymer, the at least one second polymer comprising at least one second anionic functional group and at least one second metallic cation, wherein the at least one second anionic functional group interacts with the at least one second metallic cation.

4. The rechargeable battery cell of claim 1, wherein the at least one first polymer is a polymer matrix, and the first ion-conducting ceramic particles are embedded in the polymer matrix.

5. The rechargeable battery cell of claim 3, wherein the at least one second polymer is a polymer matrix, and the second ion-conducting ceramic particles are embedded in the polymer matrix.

6. The rechargeable battery cell of claim 1, wherein the metallic anode is made of a metal selected from the group consisting of lithium, aluminum, cadmium, calcium, copper, germanium, lead, magnesium, potassium, sodium, silicon, tin, titanium, zinc, and combinations thereof.

7. The rechargeable battery cell of claim 1, wherein the metallic anode comprises lithium metal.

8. The rechargeable battery cell of claim 1, wherein the cathode is made from a compound selected from the group consisting of oxygen, porous carbon, carbon monofluoroide, thionyl chloride, sulfur, lithium cobalt oxide, lithium iron phosphate, lithium manganese oxide, lithium nickel manganese cobalt oxide, lithium nickel cobalt aluminum oxide, lithium titanate, and combinations thereof.

9. The rechargeable battery cell of claim 1, wherein the cathode comprises porous carbon and/or oxygen.

10. The rechargeable battery cell of claim 1, wherein the separator is made of a material selected from the group consisting of polyethylene, polypropylene, glass microfiber, alumina, and combinations thereof.

11. The rechargeable battery cell of claim 1, wherein the separator comprises polyethylene.

12. The rechargeable battery cell of claim 1, wherein the separator is an electrically non-conductive porous membrane.

13. The rechargeable battery cell of claim 12, wherein the electrically non-conductive porous membrane has pore dimensions in the range of 0.1 μm to 10 μm.

14. The rechargeable battery cell of claim 12, wherein the electrically non-conductive porous membrane has pore dimensions in the range of 1 nm to 100 nm.

15. The rechargeable battery cell of claim 1, wherein the first ion-conducting ceramic particles are selected from the group consisting of a perovskite-type oxide, a garnet-type oxide, lithium phosphate, a solid with the chemical formula $Li_{2+2x}Zn_{1-x}GeO_4$ where $0<x<3$, a solid with the chemical formula $Na_{1+x}Zr_2Si_xP_{3-x}O_{12}$ where $0<x<3$, lithium aluminum titanium phosphate (LATP), lithium aluminum germanium phosphate (LAGP), lithium aluminum tantalum titanium phosphate (LATTP), and combinations thereof.

16. The battery cell of claim 1, wherein the first ion-conducting ceramic particles comprise lithium aluminum tantalum titanium phosphate (LATTP).

17. The rechargeable battery cell of claim 3, wherein the second ion-conducting ceramic particles are selected from the group consisting of a perovskite-type oxide, a garnet-type oxide, lithium phosphate, a solid with the chemical formula $Li_{2+2x}Zn_{1-x}GeO_4$ where $0<x<3$, a solid with the chemical $Na_{1+x}Zr_2Si_xP_{3-x}O_{12}$ where $0<x<3$, lithium aluminum titanium phosphate (LATP), lithium aluminum germanium phosphate (LAGP), lithium aluminum tantalum titanium phosphate (LATTP), and combinations thereof.

18. The battery cell of claim 3, wherein the second ion-conducting ceramic particles comprise lithium aluminum tantalum titanium phosphate (LATTP).

19. The rechargeable battery cell of claim 1, wherein the at least one first polymer is selected from the group consisting of polysulfone, polyether sulfone, polystyrene, polyether ether ketone, polytetrafluoroethylene, and combinations thereof.

20. The rechargeable battery cell of claim 1, wherein the at least one first polymer comprises polysulfone.

21. The rechargeable battery cell of claim 3, wherein the at least one second polymer is a selected from the group consisting of polysulfone, polyether sulfone, polystyrene, polyether ether ketone, polytetrafluoroethylene, and combinations thereof.

22. The rechargeable battery cell of claim 3, wherein the at least one second polymer comprises polysulfone.

23. The rechargeable battery cell of claim 1, wherein the at least one first anionic functional group is selected from the group consisting of sulfonate, sulfate, carboxylate, phosphonate, phosphate, borate, carboxylate, silicate, and combinations thereof.

24. The rechargeable battery cell of claim 1, wherein the at least one first anionic function group comprises sulfonate.

25. The rechargeable battery cell of claim 3, wherein the at least one second anionic functional group is selected from the group consisting of sulfonate, sulfate, carboxylate, phosphonate, phosphate, borate, carboxylate, silicate, and combinations thereof.

26. The rechargeable battery cell of claim 3, wherein the at least one second anionic function group comprises sulfonate.

27. The rechargeable battery cell of claim 1, wherein the at least one first metallic cation is selected from the group consisting of lithium ions, sodium ions, potassium ions, magnesium ions, and combinations thereof.

28. The rechargeable battery cell of claim 1, wherein the at least one first metallic cation comprises lithium ions.

29. The rechargeable battery cell of claim 3, wherein the at least one second metallic cation is selected from the group consisting of lithium ions, sodium ions, potassium ions, magnesium ions, and combinations thereof.

30. The rechargeable battery cell of claim 3, wherein the at least one second metallic cation comprises lithium ions.

31. The rechargeable battery cell of claim 1, wherein the at least one first metallic cation is derived from the same metal as the metallic anode.

32. The rechargeable battery cell of claim 3, wherein the at least one second metallic cation is derived from the same metal as the metallic anode.

33. The rechargeable battery cell of claim 1, wherein the metallic anode comprises lithium metal, the cathode comprises oxygen and/or porous carbon, and the separator comprises polyethylene.

34. The rechargeable battery cell of claim 1, wherein the first ion-conducting ceramic particles comprise lithium aluminum tantalum titanium phosphate (LATTP), the at least one first polymer comprises polysulfone, the at least one first anionic functional group comprises sulfonate, and the at least one first metallic cation comprises lithium ions.

35. The rechargeable battery cell of claim 3, wherein the second ion-conducting ceramic particles comprise lithium aluminum tantalum titanium phosphate (LATTP), the at least one second polymer comprises polysulfone, the at least one second anionic functional group comprises sulfonate, and the at least one second metallic cation comprises lithium ions.

36. The rechargeable battery of claim 1, comprising at least one electrolyte disposed between the metallic anode and the cathode, the at least one electrolyte comprising a lithium salt dissolved in an organic solvent.

37. The rechargeable battery of claim 1, comprising at least one electrolyte disposed between the metallic anode and the cathode, the at least one electrolyte comprising a lithium salt in a polymer gel matrix.

38. A rechargeable battery cell comprising:
   a metallic anode;
   a cathode; and
   a porous membrane between the cathode and metallic anode, wherein the porous membrane has a coating layer disposed between the porous membrane and the metallic anode, wherein the coating layer comprises a mixture of ion-conducting ceramic particles and at least one polymer, the at least one polymer comprising at least one anionic functional group and at least one metallic cation, wherein the at least one anionic functional group interacts with the at least one metallic cation to suppress dendritic growth on the metallic anode.

39. A method for formulating the rechargeable battery cell of claim 1, comprising the steps of:
   (a) obtaining an electrically non-conductive porous membrane as the separator, wherein the separator has two sides;
   (b) coating one side of the separator with the first coating layer;
   (c) placing the coated separator between the metallic anode and the cathode, wherein the first coating layer is disposed between the separator and the metallic anode, wherein upon electrical charging of the rechargeable metal battery cell, the first coating layer suppresses dendritic growth on the metallic anode.

40. A method for formulating the rechargeable battery cell of claim 3, comprising the steps of:
   (a) obtaining an electrically non-conductive porous membrane as the separator, wherein the separator has two sides;
   (b) coating one side of the separator with the first coating layer and the other side of the separator with the second coating layer;
   (c) placing the coated separator between the metallic anode and the cathode, wherein the first coating layer is disposed between the separator and the metallic anode and the second coating layer is disposed between the separator and the cathode,
   wherein upon electrical charging of the rechargeable metal battery cell, the first and second coating layers suppress dendritic growth on the metallic anode.

* * * * *